(12) United States Patent
Mehta et al.

(10) Patent No.: US 10,705,690 B1
(45) Date of Patent: Jul. 7, 2020

(54) SENDING VIRTUAL DESKTOP INFORMATION TO MULTIPLE DEVICES

(71) Applicant: Amazon Technologies, Inc., Seattle, WA (US)

(72) Inventors: Gaurang Pankaj Mehta, Seattle, WA (US); Varun Verma, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 236 days.

(21) Appl. No.: 14/644,064

(22) Filed: Mar. 10, 2015

(51) Int. Cl.
*H04L 12/18* (2006.01)
*G06F 3/0484* (2013.01)

(52) U.S. Cl.
CPC ........ *G06F 3/0484* (2013.01); *H04L 12/1822* (2013.01)

(58) Field of Classification Search
CPC .. G06F 3/0484; G06F 9/4445; G06F 9/45533; G06F 9/4451; H04L 12/1822
See application file for complete search history.

(56) References Cited

U.S. PATENT DOCUMENTS

| | | | |
|---|---|---|---|
| 9,172,724 B1 * | 10/2015 | Reddy | H04L 63/20 |
| 2009/0217177 A1 * | 8/2009 | DeGrazia | G06F 3/0481 |
| | | | 715/753 |
| 2011/0107409 A1 * | 5/2011 | Wilkinson | G06F 21/335 |
| | | | 726/8 |
| 2012/0030579 A1 * | 2/2012 | Morard | H04L 67/148 |
| | | | 715/740 |
| 2012/0066607 A1 * | 3/2012 | Song | G06F 9/5077 |
| | | | 715/737 |
| 2012/0110576 A1 * | 5/2012 | Lin | G06F 9/50 |
| | | | 718/1 |
| 2013/0007737 A1 * | 1/2013 | Oh | G06F 9/4445 |
| | | | 718/1 |
| 2014/0165164 A1 * | 6/2014 | Pizurica | H04L 67/36 |
| | | | 726/5 |
| 2015/0003313 A1 * | 1/2015 | Shao | H04L 67/10 |
| | | | 370/312 |
| 2015/0163182 A1 * | 6/2015 | Chandrasekaran | H04L 51/063 |
| | | | 709/204 |

* cited by examiner

*Primary Examiner* — Soe Hlaing
(74) *Attorney, Agent, or Firm* — Davis Wright Tremaine LLP

(57) ABSTRACT

A virtual desktop service may receive a request from a user to provision a virtual desktop and establish a secure communications connection between the virtual desktop service, a user client device, and additional client devices via a proxy server in order to stream same feed or virtual screens from the virtual desktop to multiple client devices. The virtual desktop service may provide for natively sharing or multiplexing an entire data stream from a virtual desktop to multiple client devices or natively sharing or multiplexing portions of a data stream from a virtual desktop to render each portion on a different client device.

21 Claims, 7 Drawing Sheets

SENDING VIRTUAL DESKTOP INFORMATION TO MULTIPLE DEVICES

BACKGROUND

Current workspaces or remote desktop applications are provisioned for organizing and sharing files, and are commonly used as business communication tools for assigning tasks, scheduling meetings, and maintaining business information that is available across remote desktop terminals. Generally, virtual or remote desktop clients may span across multiple monitors only when the native operating system and device the client is executed on support multiple screens. In order to support a large number of collocated devices, such as a wall of multiple mobile devices (e.g., multiple televisions, tablet computers, e-books, etc.), where any number of the devices is running a different set of clients, a need exists to provide a method to display the same screen simultaneously on all devices, display the same screen expanded on multiple devices, provide multiple virtual windows or screen-desktops to increase screen real estate, and the like.

BRIEF DESCRIPTION OF THE DRAWINGS

Various embodiments in accordance with the present disclosure will be described with reference to the drawings, in which.

DETAILED DESCRIPTION

Figure 1:
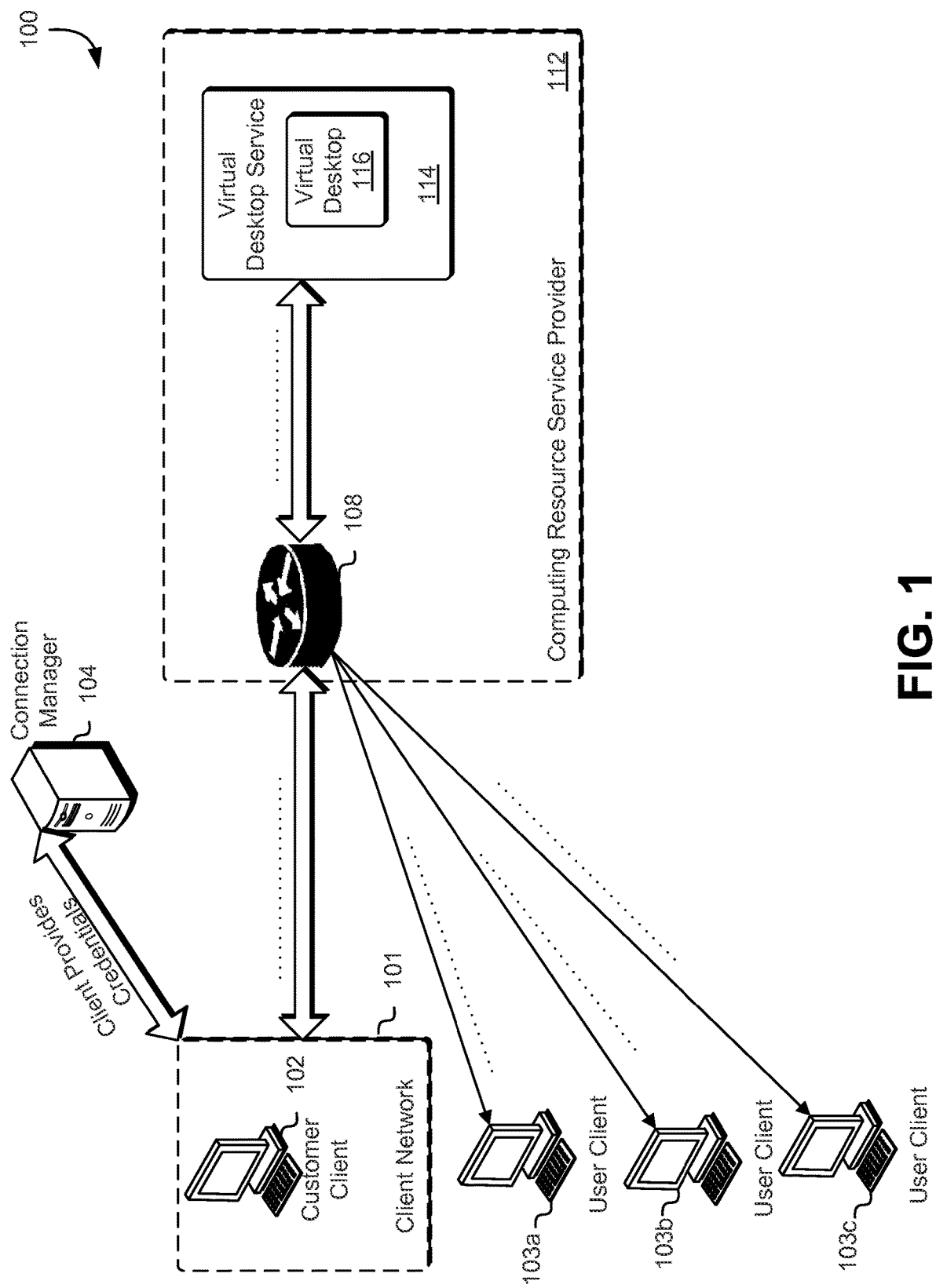
FIG. 1 is an illustrative example of an environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the joining of a client to a virtual computing service through client registration operations. In an embodiment, an administrator associated with a customer, via a virtual computing service, requests a virtual desktop environment be established in order to be utilized by the administrator, non-personal users, and/or non-desktop users. The administrator may be required to provide administrator credentials or authorization information, such as a username and password pair, in order to be authenticated with a user account for the administrator. The user account may specify permissions available for that user, such as what resources the user may access, create, and/or modify within the virtual desktop environment.

After the administrator has been authorized, the administrator may configure the virtual desktop environment according to the customer's needs. The administrator may request from the virtual desktop service that a virtual desktop or remote desktop be provisioned in order to share the virtual desktop with other client devices. For example, if the customer intends to provide access to the virtual desktop environment for ten client devices, the administrator may generate one or more client registration credentials to be provided to the client devices. The client registration credentials may be utilized by the virtual desktop environment to determine whether the client devices are authorized to access a virtual desktop of the virtual desktop environment. The client registration credentials may further contain a network address or information related to a specific virtual desktop that the client device is authorized to access.

In some example embodiments, the client devices may be a computer terminal that consists mostly of just a display monitor, a keyboard, and perhaps a mouse; such terminals are frequently referred to as "dumb terminals." For example, the client may simply be a display monitor without an internal central processing unit (CPU) or hard disk drive (HDD); thus, a client may have little or no processing power on its own. In such cases, the client device may be operably interconnected to a network via a service provider that includes one or more servers configured to run one or more application programs that may be accessed via the client terminal. The client device may similarly be a network computer, a thin client, or any other form of computing device configured to provide a graphical user interface for receiving resources from the virtual desktop environment.

In the case of a "dumb client" or non-personal client (e.g., a computer terminal operating without a user), the administrator may provide the client registration credentials to the client or may enter the client registration credentials into the non-personal client in order for the client to gain access to the virtual desktop environment. In other embodiments, a user of a client provides the client registration credentials to a security gateway, such as an authorization or proxy server in order to access the virtual desktop environment. If the security gateway is able to authenticate, based on the provided client registration credentials, that the user of the client is authorized to access the virtual desktop environment, the security gateway may establish or provision a secure communications channel between the user's client and a virtual desktop of the virtual desktop environment.

In this manner, a client device may join the virtual desktop environment via the security gateway in order to access or receive data streams from the virtual desktop without having to install or download an agent. Once the client devices have been authorized and have established connections with the security gateway, the administrator may begin streaming data from the virtual desktop to the multiple client devices. For example, the administrator's client may receive a virtual desktop transmitted by an operating system running on an agent of the virtual desktop service. The virtual desktop may be transmitted to the administrator's client via the security gateway and, once received, the administrator may manipulate the virtual desktop via a user input device associated with the administrator's client device. The manipulated representation or description appearing on the virtual desktop is transmitted back to the agent via the gateway, and the virtual desktop service implements the modified or manipulated representation or description of what appears on the virtual desktop at the agent and transmits the new (i.e., updated) virtual desktop to the gateway. This process of manipulating and updating the virtual desktop may continue based on the needs of the administrator or other rationales.

In an embodiment, the client devices with established communications channels connecting the client device to the virtual desktop service via the gateway may begin receiving data streams from the security gateway in read-only manner, such that the client devices may receive data from the gateway but may not transmit data to the gateway. In addition, the techniques described and suggested herein can facilitate additional technical advantages. For example, because, in some embodiments, because the agent is available from the virtual desktop service, the client devices do not need to install or download a service specific or client specific agent. Further, as the client devices are operably interconnected to the virtual desktop service via the gateway, no client is directly connected with the administrator's client; the clients may continue to receive all data streams configured for each client even in the event of a failure or disconnection by the administrator's client.

FIG. 1 is an example embodiment of an environment 100 for implementing aspects in accordance with various embodiments. As will be appreciated, although a virtual desktop service environment is used for purposes of explanation, different environments may be used, as appropriate, to implement various embodiments. In the environment 100, a computing resource service provider 112 provides various computing resource services to customers of the computing resource service provider. The computing resource service provider 112 may be an organization that hosts various computing resources on behalf of one or more customers. For example, a computing resource service provider may operate one or more facilities that are used to host various computing hardware resources, such as hardware servers, data storage devices, network devices and other equipment, such as server racks, networking cables and the like.

The computing resource service provider may utilize its computing hardware resources to operate one or more services. Such services may include services that enable customers of the computing resource service provider to remotely access computing resources to support the customers' operations. The services may be used by customers to support a wide variety of activities, such as multicasting advertisements on digital billboards, operating enterprise systems supporting an organization using virtual desktops, multiplexing data streams from virtual displays from the same virtual desktop to multiple devices, and/or other activities. A virtual desktop service may be used for commercial advertising boards, scientific multiple-visual display walls, and other client devices in order to receive a virtual desktop via the service. Further example use cases may include a single computing device providing different advertisements on different devices, such as a remote computer multicasting multiple advertisements to multiple billboards in different geographic locations or a single computing device multiplexing a same data stream on multiple digital billboards or client devices. Additional use cases may include sectioning portions of a single desktop display or single virtual desktop to multiple devices, such that a display may be divided into quadrants and each quadrant is multiplexed to one of four different devices.

The customer may be an individual, organization or automated process that could utilize one or more services provided by the computing resource service provider 106 to provision and manage one or more resources to support operations. In some embodiments, the computing resource service provider may provide for virtual desktop services 114, which may include hardware servers, data storage devices, network devices and other equipment, such as server racks, networking cables and the like for hosting virtual desktops 116 for customers.

As illustrated in FIG. 1, the environment 100 includes a virtual desktop service 114 that may be provided by a computing resource service provider 112 to its customers and other users. The virtual desktop service 114 may comprise one or more physical hosts, which may be used to instantiate one or more virtual machine images. These one or more virtual machine images may include an operating system and one or more applications. As with the customer client 102, the virtual desktop service 116 may provide customers and other users with a virtual computing environment interface, which may be used to multiplex, multicast, and/or stream data streams from a single customer client to multiple user clients.

The virtual computing environment may include one or more agents that are configured to verify user identities and establish a connection between the virtual computing environment and the client network 101 and/or the user clients 103a-c to enable access to the virtual desktop. For example, the client network 101 may include or be operably interconnected to a connection manager 104, which may be an agent configured to enable joining of one or more clients to the virtual desktop service 114. In an embodiment, an administrator, via a customer client 102, may access the virtual desktop service 114 to provision one or more virtual desktops 116. An administrator using customer client 102 may provide administrative credentials usable to identify the administrator and/or an associated account specifying one or more permissions for accessing and modifying objects within the virtual desktop. The credentials may be used by the connection manager 104 in order to authenticate the administrator, confirm that the customer client 102 maintains the proper authority to access the virtual desktop, and perform additional configuration and connection procedures directed to the provisioning of a communications channel between the client and the virtual desktop service.

The connection manager, once having determined proper authorization of the requesting customer client, may provide the customer client 102 with a network address of the virtual desktop 116 which the customer client is attempting to access. The customer client 102 may further request the connection manager or other server operably interconnected thereto, provide registration credentials, such as user names, passwords, and registration codes for user clients 103a-c that the administrator determines or decides to have join the virtual desktop service. The registration codes are provided to the user clients 103a-c, which use the credentials to request, from a security gateway 108, that a communications channel be provisioned, where the communications channel is used to connect the user client to the virtual desktop service via the security gateway 108. The security gateway 108 may be a proxy server configured to enable connections between the clients and the virtual desktop service in order for the clients to receive access to the virtual desktop.

Figure 2:
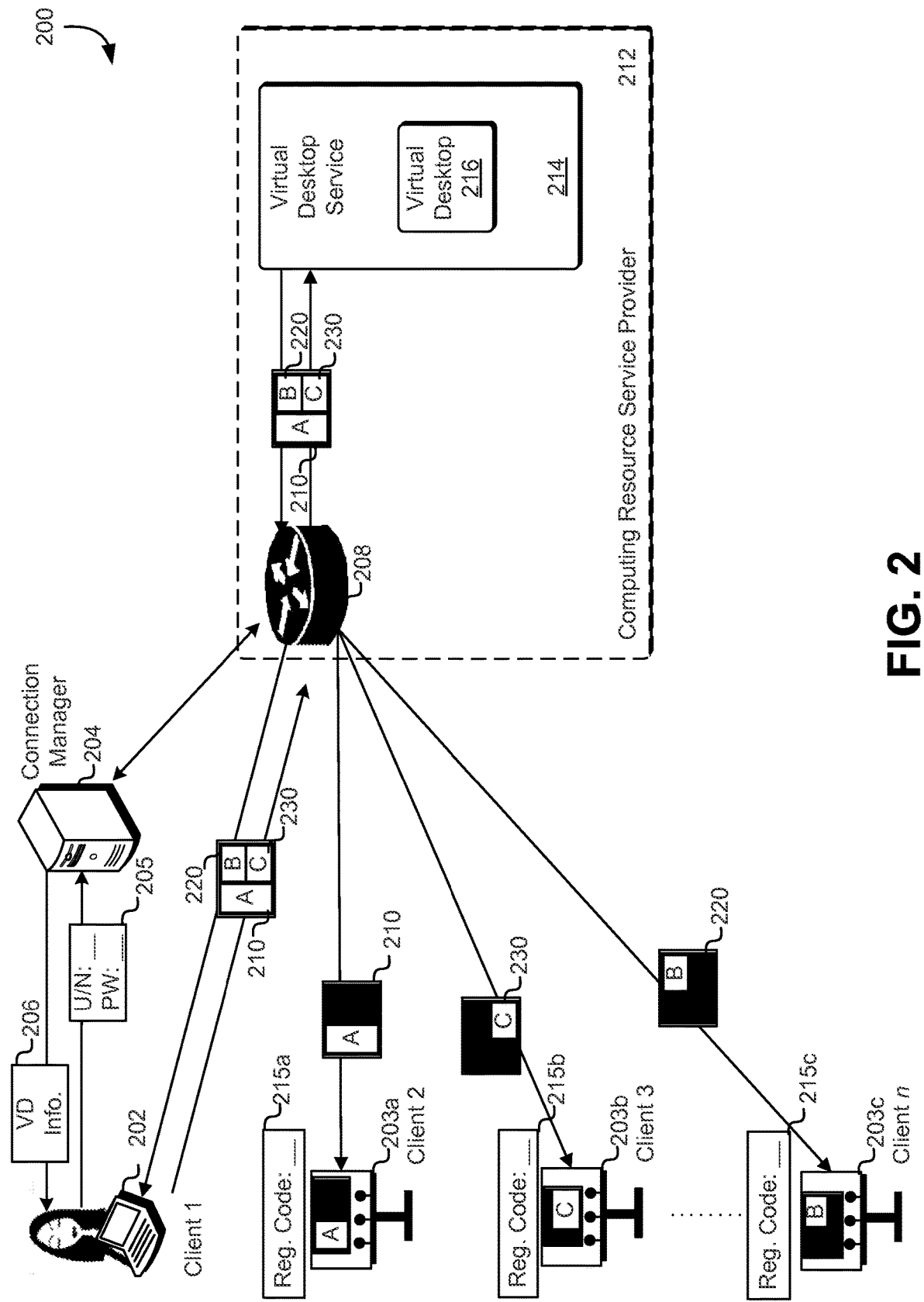
FIG. 2 is an illustrative example of an environment in which a user is authenticated for access to a virtual desktop service through a connection manager according to various embodiments that can be implemented.

FIG. 2 is an illustrative example of an environment 200 in which a user is authenticated for access to a virtual desktop service through a connection manager according to various embodiments. The environment of FIG. 2 provides for a first client 202 provisioning a virtual desktop service (VDS) 214 via a connection manager 204. The first client 202 provides credential pairs to the connection manager, such as a username and password 205, in order to be authenticated by the connection manager. The connection manager may be an authentication server or other administrative console configured to at least manage the connections or possible connections between the clients, being in at least one network, and the virtual desktop service being in a different network.

Once the connection manager 204 receives the credential pairs, the connection manager may access a user account associated with the credentials to determine whether the credentials are authentic and, if so, determine whether the first client is authorized to access and/or modify the virtual desktop (VD) 216 in the virtual desktop service 214. Authentication, authorization, and/or registration information may include credentials and/or information derived from credentials, including information cryptographically derived from credentials. The registration information may be generated and provided to a client, such that the registration information includes the registration credentials. After the connection manager has authenticated the first client and determined the access the first client is to be provided, the connection manager provides the first client 202 with information regarding the virtual desktop 206 the first client is permitted to access. Furthermore, the connection manager may provide an acknowledgement to the security gateway 208 that the first client has been authenticated and is authorized up to certain permissions to access the virtual desktop service 214 and perform one or more actions using the virtual desktop 216 or other permitted activities.

In some example embodiments, a servant client may be configured to transmit a request message, to the connection manager, to receive a virtual desktop from the virtual desktop service. The connection manager, in real time, near real time or based on previously configured administrative controls, may grant or deny the request. When the connection manager grants the request from the servant client, the connection manager responds to the servant client and provides a token. The servant client transmits the token to the security gateway in order to receive the virtual desktop, and the security gateway transmits the token back to the connection manager to confirm the token is valid. Once the token is validated by the connection manager, the security gateway initiates a log-in process for the servant client.

Provided by a computing resource service provider 212, the virtual desktop service 214 is provisioned according to a request for a network resource made by the first client. The virtual desktop service may include one or more physical hosts, which may be used to instantiate one or more virtual machine images that may include an operating system and one or more applications. The virtual desktop service 214 having the established VD 216 may transmit the VD (e.g., may transmit a representation or description of what appears on the virtual desktop 216) from the operating system of the host to the first client 202 via the security gateway 208. In the example embodiment of FIG. 2, the virtual desktop is shown as combined blocks 210, 220, and 230, which is transmitted from the VDS to the gateway 208 and then to the first client. A user of the first client, upon receipt of the VD at the first client, may manipulate the VD as per the user's permissions, and the information detected as being performed by the user of the first client is transmitted (e.g., via a data stream) to the virtual desktop service via the gateway 208.

Once the VDS 214 receives a modified or manipulated representation or description of what appears on the virtual desktop from the first client 202, the VDS implements the manipulations performed by the user of the first client at the server and transmits the new VD (being the updated version of the original VD) back to the gateway 208. This process (e.g., the path from the VDS to the gateway to the first client, and then from first client to the gateway to the VDS) may continue for an undefined period of time (e.g., indefinitely), as the communications channel is open and is available for the user of the first client while using the virtual desktop in some capacity.

The various modification, manipulations, or access the user of the first client performs on the VD may be monitored by the virtual desktop service in order to determine changes made. Some embodiments include detecting input made by the user of the first client via an input method, for example, such as user input from a computer keyboard, virtual keyboard or motion from a pointing device such as a mouse or a finger on a touch-screen. Additional examples of input received by a client may include, for example, detecting scrolling in a window, detecting the distance of a scroll event, detecting resizing of a graphical user interface and other events currently known or hereinafter developed useful for tracking human user input. As some scripting languages, such as JavaScript®, are configured to be executed locally in a client, a client executing a script may detect a user's actions on the client, such as individual keystrokes or mouse movements or other events from an input device. It is noted that an input device may be a physical or virtual input device. Examples of interaction events may include, mouse click events, key stroke events, touchscreen events, swipe events, gesture events, window resize events, haptic response events, scrolling events, mouse movements and other such human user actions currently known or hereinafter determined for tracking user behavior. Such interaction event data, and possibly additional data/information attached thereto, may be recorded in a log or memory at, or operably interconnected with, the client, the gateway, and/or the virtual desktop service.

Turning back to FIG. 2, three additional clients, such as clients 203a-c, may be digital billboards that are configured to receive content (e.g., audiovisual content) from a streaming server. A user interacting with a remotely executed computer system desktop environment, such as the virtual desktop service 214, may provide information to the streaming server to provide the content to the additional clients. The clients 203a-c are provided with respective registration codes 215a-c by the first client and the registration codes are utilized by the security gateway 208 in order to identify and authorize each of the clients 203a-c and provision a secure communications channel for each of the clients. Once the clients 203a-c have been connected with the virtual desktop service in the virtual computing environment, each client's access is defined by the administrator's configurations (not shown).

Accordingly, the embodiment of FIG. 2 depicts client 203a receiving a first portion 210 of the virtual desktop 216 displaying an "A" in the billboard; client 203b receiving a second portion 230 of the virtual desktop 216 displaying a "C" in the billboard; and client 203c receiving a third portion 220 of the virtual desktop 216 displaying a "B" in the billboard. The administrator is able to configure the viewing specifications for each client accessing the virtual desktop service, such that the administrator may manipulate the virtual desktop in the manner they choose, and the three portions 210, 220, and 230 of the virtual desktop 216 will only be multiplexed to the client that is configured to receive that portion of the virtual desktop. In other words, the security gateway 208 is provided with configuration terms such that the data stream of the virtual desktop 216 is multiplexed into three portions, such that portion "A" 210 is only multiplexed to client 203*a*, portion "B" 220 is only multiplexed to client 203*c*, and portion "C" 230 is only multiplexed to client 203*b*.

In alternative example embodiments, when a customer or other administrator first accesses the virtual computing environment service, he/she may request provisioning of one or more virtual computing environments, which delegated users may utilize to interact with one or more applications and data as defined by the customer or other administrator. In this manner, a client device may join the virtual desktop environment via the security gateway in order to access or receive data streams from the virtual desktop without having to install or download an agent. Once the client devices have been authorized and have established connections with the security gateway, the administrator may begin streaming data from the virtual desktop to the multiple client devices. For example, the administrator's client may receive a virtual desktop transmitted by an operating system running on an agent of the virtual desktop service. The virtual desktop may be transmitted to the administrator's client via the security gateway and, once received, the administrator may manipulate the virtual desktop via a user input device associated with the administrator's client device. The manipulated representation of what appears on the virtual desktop is transmitted back to the agent via the gateway and the virtual desktop service implements the modified representation of what appears on the virtual desktop at the agent and transmits the new (i.e., updated) virtual desktop to the gateway. This process of manipulating and updating the virtual desktop may continue based on the needs of the administrator or other rationales.

Figure 3:
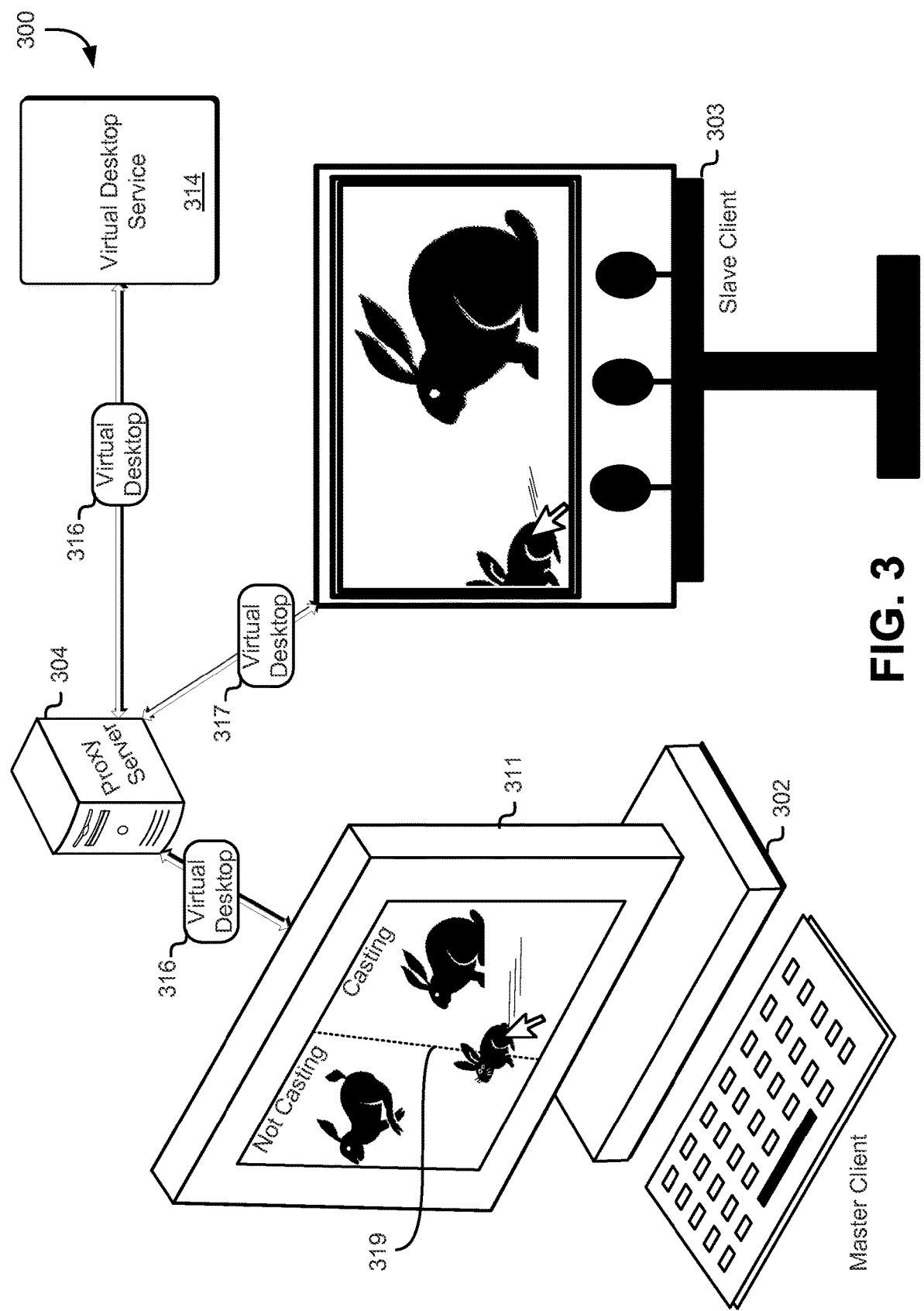
FIG. 3 is an illustrative example of an environment in which a client receives a virtual desktop from a virtual desktop service in accordance with at least one embodiment.

FIG. 3 is an illustrative example of an environment 300 showing a master client user interface and a servant client user interface in accordance with at least one embodiment. FIG. 3 displays a master client 302, which may be an administrator client with a split-screen monitor 311 that enables the administrator to divide the portion of their graphical user interface into multiple sections. In the instant embodiment, the split-screen monitor is divided into two sections, delineated by a "casting" half and a "not casting" half of the monitor. This enables the administrator to maintain applications on their screen without sharing it with the servant clients, such as servant client 303.

The servant client 303 is a billboard terminal receiving the virtual desktop from the master client via the proxy server 304. As in FIGS. 1 and 2, the servant client is configured to receive client credentials from the administrator in order to request to join the virtual computing environment provided by the virtual desktop service 314. The virtual desktop service 314 provides the virtual desktop 316 to the master client via the proxy server 304, wherein the proxy server is configured to multiplex a data stream to the servant client according to the configurations selected by the administrator. The proxy server may be a multi-tenant service implemented via a computer resource service provider, which may be an Internet-as-a-Service, Platform-as-a-Service, and/or Software-as-a-Service provider. The proxy server may be scaled according to the number of clients (or instances) that are receiving the data stream.

The administrator may manipulate the virtual desktop 316 on the monitor 311 such that there is a visible delineating line 319 to provide visual reference for the user to determine which applications are being multi-casted to a group of clients and which applications are simply visible to the user. At the servant client 303, the virtual desktop 317 is being multiplexed by the proxy server to the servant client in order to provide the servant client with the data stream configured by the administrator to be accessed by the servant client. The administrator may determine the configurations prior to provisioning the virtual desktop service or may configure the servant configurations when the commands are executed (e.g., at runtime). The administrator may further modify the applications on the monitor in order to move an application from the not casting portion of the monitor to the casting portion of the monitor.

In alternative example embodiments, the virtual computing environment allows for scalability for security based on the number of instances receiving multicasting, such that a master client may establish a communication channel with a desktop service, servicing multiple desktops, via multiple security gateways.

Figure 4:
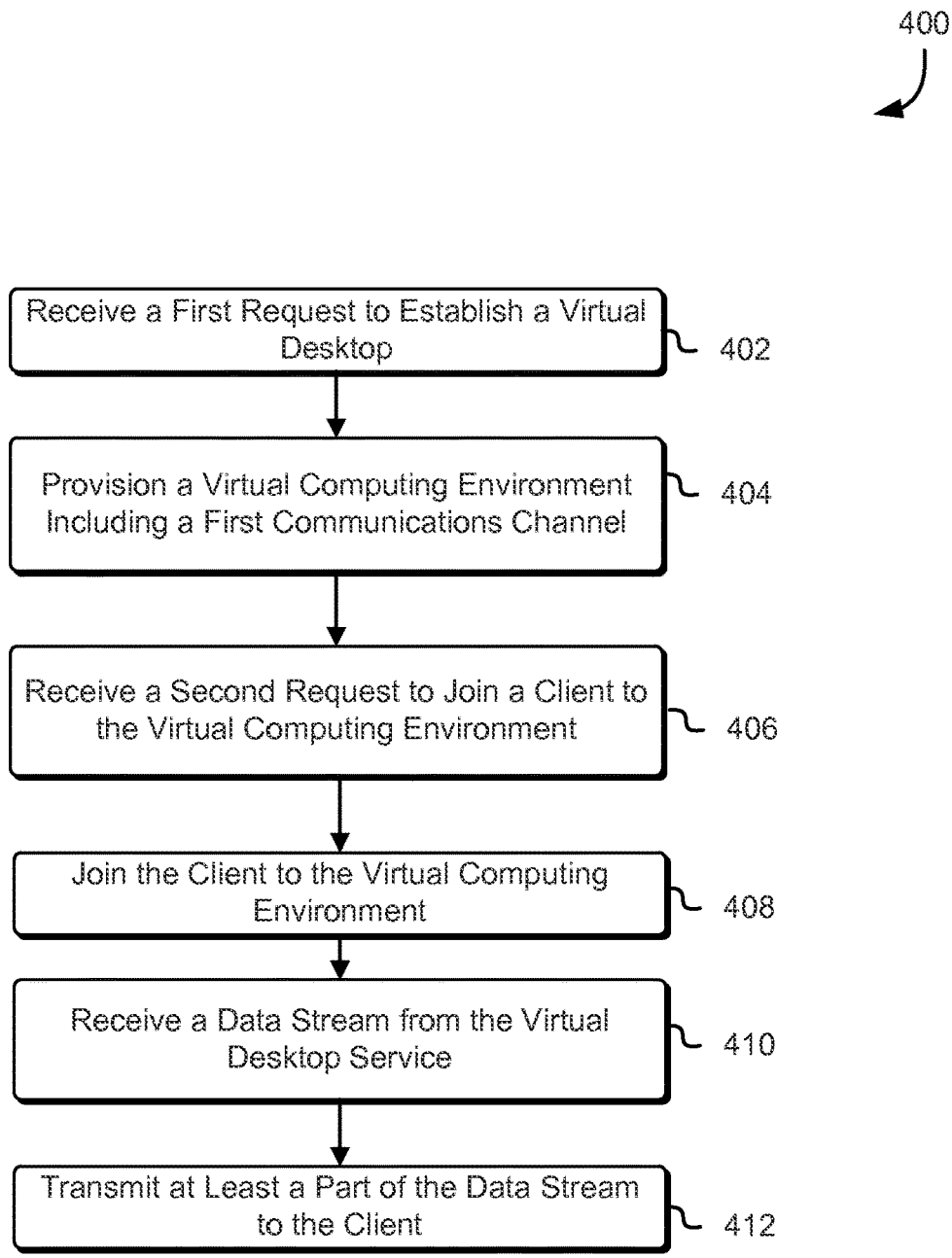
FIG. 4 is an illustrative example of a process for authenticating a user for access to a virtual desktop service in accordance with at least one embodiment.

FIG. 4 is an illustrative example of a process 400 for authenticating a user for access to a virtual desktop service in accordance with at least one embodiment. The process 400 may be accomplished by a proxy server, such as a security gateway 208 depicted and described in connection with FIG. 2 or a suitable component thereof. As illustrated in FIG. 4, the process 400 may include a gateway receiving a request to establish a virtual desktop (402). The gateway may provision a virtual computing environment, including establishing a secure communications channel between a master client and the virtual desktop service (404).

The gateway may further be configured to receive additional requests, where a servant client provides registration credentials from the master client to the gateway (406). Once the gateway or other suitable component thereof has successfully authorized the servant client based at least in part on the provided registration credentials, the gateway establishes a communications channel for the servant client to join the virtual computing environment (408). The gateway receives a data stream from a virtual desktop service (410) and transmits at least a part of the data stream to a servant client (412).

In further example embodiments, an agent, such as a server, operating within the virtual desktop service may be configured to monitor one or more of the user clients or servant clients to ensure that the request to join the virtual desktop service to the one or more managed directories is fulfilled. Further, the agent may perform other actions to address failures associated with a user client being denied access to the virtual desktop service (e.g., transmit notification to an administrator or the customer regarding the issue).

Figure 5:
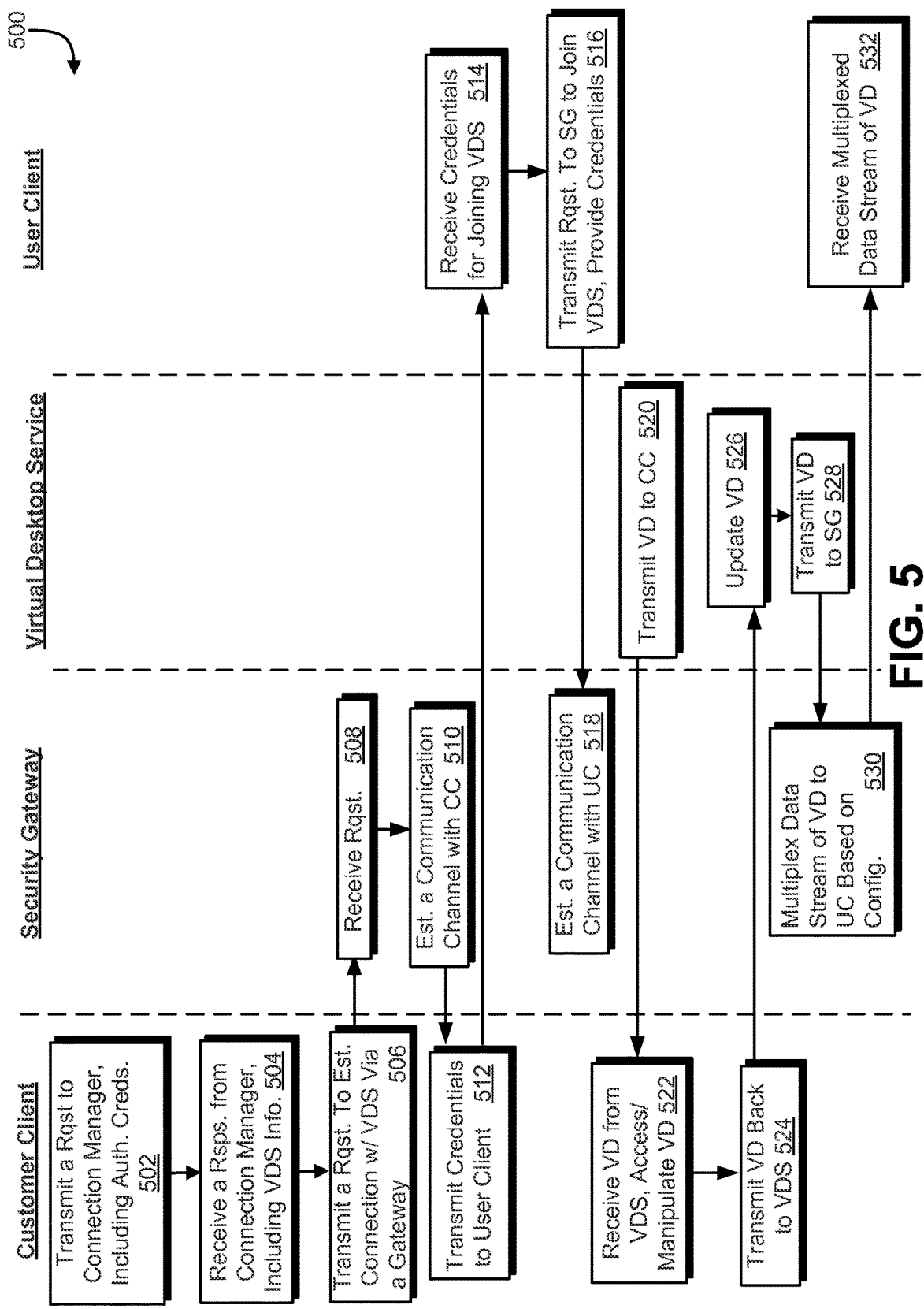
FIG. 5 is an illustrative example of a swim diagram in accordance with at least one embodiment.

FIG. 5 is a swim diagram illustrating a process 500 for provisioning a virtual desktop in a virtual desktop service in accordance with some embodiments. The process 500 may be performed, for example, by various components of the virtual computing environment described and illustrated in connection with FIGS. 1-3. For example, the process 500 may be performed by a customer client, such as the customer client 102, a virtual desktop service, such as the virtual desktop service 114, a user client, such as the user client 103, and a security gateway, such as the security gateway 108 all depicted and described in connection with FIG. 1 or a suitable component thereof.

Returning to FIG. 5, the process 500 includes at a step 502, a customer client transmitting, to a connection manager, a request to provision a virtual desktop service, and including authorization credentials of the customer client. In step 504, the customer client receives a response from the connection manager, based on the credentials being authorized, including virtual desktop service configuration information. The configuration information includes, for example, a network address for the virtual desktop service. At step 506, the customer client transmits a request, to a security gateway, to establish a communications connection with a virtual desktop service. The security gateway, at step 508, receives the request and, at step 510, establishes a secure communications connection between the customer client and the virtual desktop service.

At step 512, the customer client transmits, to the user client, credentials for the user client to join the virtual desktop service. The customer client may transmit user client credentials at any time after the customer client has requested the credentials be generated. The user client, at step 514, receives the credentials to provide to the security gateway with a request to join the virtual desktop service. Joining the virtual desktop service may include maintaining limited access rights to read data from and transmit data to the security gateway. At step 516, the user client transmits, to the security gateway, a request to join the virtual desktop service, the request including the provided credentials for the user client. Upon receipt and validation of the credentials, at step 518, the security gateway establishes a communications channel with the user client, wherein the user client is in direct communications with the security gateway, but is not directly connected with the customer client.

At step 520, the virtual desktop service transmits a virtual desktop to the customer client via the security gateway. The customer client, at step 522, receives the virtual desktop from the virtual desktop service and a user of the customer client may access, manipulate, or modify the virtual desktop according to the authorizations provided. At step 524, the customer client transmits the virtual desktop back to the virtual desktop service via the security gateway. The virtual desktop may similarly be automatically returned to the virtual desktop service based on certain actions; for example, the virtual desktop may be updated at the virtual desktop service each time the user of the customer client opens a new file. The virtual desktop service receives the manipulated representation of what appears on the virtual desktop, and, at step 526, updates the original virtual desktop with the changes performed by the user of the customer client. The virtual desktop service transmits the virtual desktop to the security gateway at step 528. In some example embodiments, the virtual desktop may be automatically provided to the security gateway upon completion of the updated information.

At step 530, the security gateway, having received an updated virtual desktop including the changes or actions performed on it by the user of the customer client, multiplexes a data stream of the virtual desktop to the user clients associated with the virtual desktop service. At step 532, the user clients receive the multiplexed data stream of the virtual desktop according to the configuration for each user client.

While many of the disclosed embodiments are described in the context of a system where the client device is remotely situated from other computing resources, at least some embodiments can also be used in situations where the client device interacts with computing resources located in an on-premises installation. For example, the client device could use a virtual desktop infrastructure (VDI) located within the same building or campus as the client device.

Figure 6:
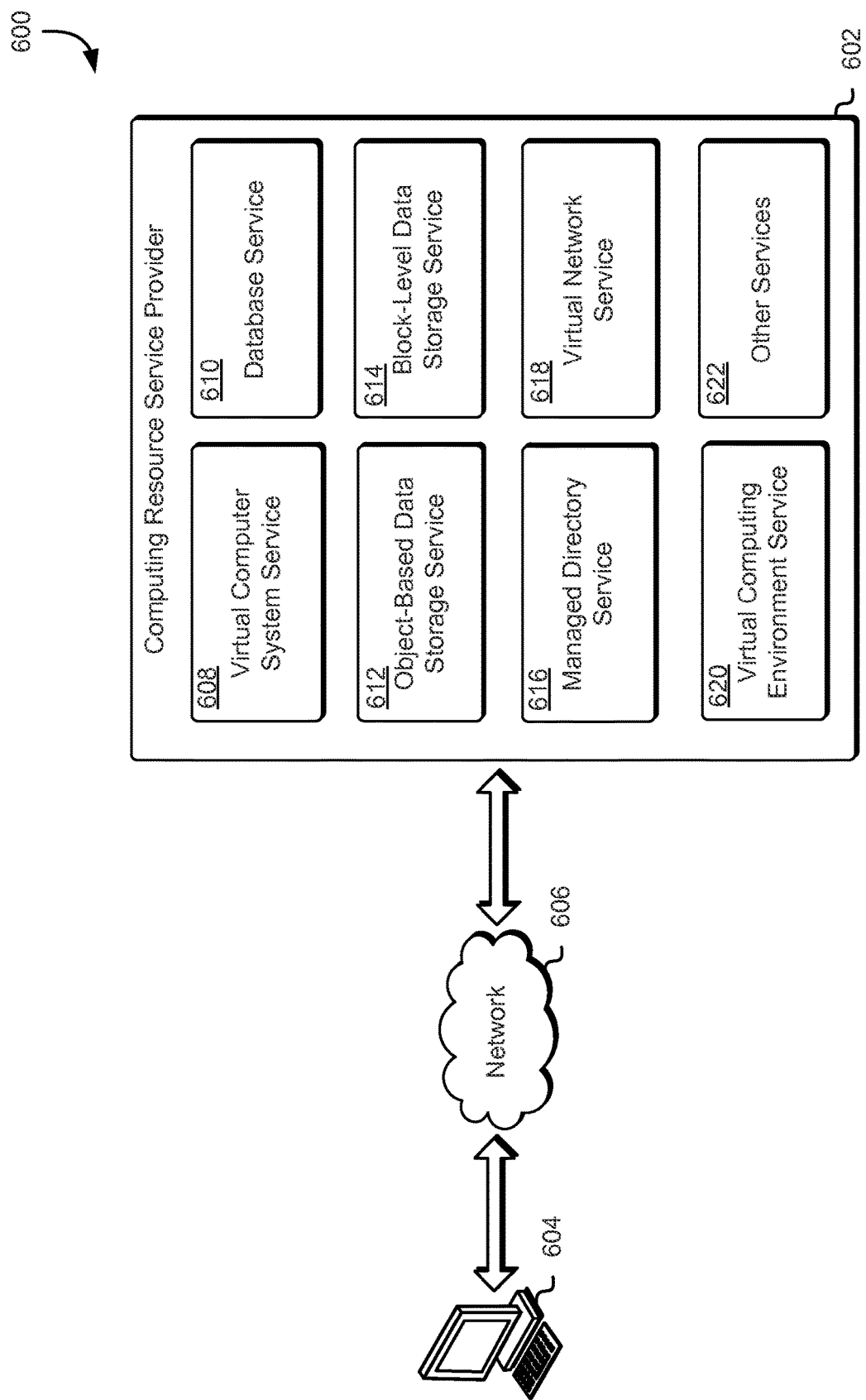
FIG. 6 is an illustrative example of an environment in accordance with at least one embodiment.

FIG. 6 shows an illustrative example of an environment 600 in which various embodiments can be implemented. In the environment 600, a computing resource service provider 602 may provide a variety of services to a customer 604 or other users. The customer 604 may be an organization that may utilize the various services provided by the computing resource service provider 602 to remotely generate and maintain one or more resources and provide a mapping of user roles for use within a customer network to enable management of one or more delegated access permissions to define a level of access for users of his or her resources. As illustrated in FIG. 6, the customer 604 may communicate with the computing resource service provider 602 through one or more communications networks 606, such as the Internet. Some communications from the customer 604 to the computing resource service provider 602 may cause the computing resource service provider 602 to operate in accordance with various techniques described herein or variations thereof.

As noted above, a computing resource service provider 602 may provide various computing resource services to its customers. For instance, in this particular illustrative example, the computing resource service provider 602 provides at least seven types of services. The services provided by the computing resource service provider, in this example, include a virtual computer system service 608, a database service 610, an object-based data storage service 612, a block-level data storage service 614, a managed directory service 616, a virtual network service 616, a virtual computing environment service 620 and one or more other services 622, although not all embodiments of the present disclosure will include all such services and additional services may be provided in addition to or as an alternative to services explicitly described herein.

The virtual computer system service 608 may be a collection of computing resources configured to instantiate virtual machine instances onto virtual computer systems on behalf of the customers 604 of the computing resource service provider 602. Customers 604 of the computing resource service provider 602 may interact with the virtual computer system service 608 to provision and operate virtual computer systems that are instantiated on physical computing devices hosted (e.g., physical hosts) and operated by the computing resource service provider 602. The virtual computer systems may be used for various purposes, such as to operate as servers supporting a website. Other applications for the virtual computer systems may be to support database applications, electronic commerce applications, business applications, and/or other applications.

The object-based data storage service 612 may comprise a collection of computing resources that collectively operate to store data for a customer 604. The data stored in the data storage service 612 may be organized into data objects. The data objects may have arbitrary sizes except, perhaps, for certain constraints on size. Thus, the object-based data storage service 612 may store numerous data objects of varying sizes. The object-based data storage service 612 may operate as a key value store that associates data objects with identifiers of the data objects, which may be used by the customer to retrieve or perform other operations in connection with the data objects stored by the object-based data storage service 612. Access to the object-based data storage service 612 may be through appropriately configured API calls.

The block-level data storage service 614 may comprise a collection of computing resources that collectively operate to store data for a customer. For instance, the block-level data storage system may be configured to provide block-level data storage volumes for use with a virtual machine instance, as noted above. A customer may interact with the block-level data storage service 614 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed directory service 616 may provide a variety of services to enable computer systems and/or computer system client devices to access customer directories including, but not limited to, authentication, authorization, and directory services. For example, the managed directory service 616 may provide authentication services, which may authenticate credentials of a user, computer system, process, automated process or other such entity to at least determine whether that entity is authorized to access the managed directory service 616 and/or the customer directories associated with the managed directory service 616. In some embodiments, the credentials may be authenticated by the managed directory service 616 itself, or they may be authenticated by a process, program or service under the control of the managed directory service 616, or they may be authenticated by a process, program or service that the managed directory service 616 may communicate with, or they may be authenticated by a combination of these and/or other such services or entities.

The managed directory service 616 may also provide authorization services, which may authorize a user, computer system, process, automated process, or other such entity to at least determine which actions of one or more possible actions that entity may perform. Examples of actions that an entity may or may not be authorized to perform include, but are not limited to, creating directories on the customer directory, destroying directories on the customer directory, attaching to directories on the customer directory, detaching from directories on the customer directory, providing access links to directories on the customer directory, reclaiming access links to directories on the customer directory, allowing reads from directories on the customer directory, allowing writes to directories on the customer directory and/or other such actions.

The managed directory service 616 may also provide directory services, which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a URI object or some other such linkage. As may be contemplated, the URI may be provided by the computer system client device, or by a process running at the data center, or by a process running on a computer system connected to the data center, or by the managed directory service 716, or by a combination of these and/or other such computer system entities.

The virtual network service 618 may enable customers to provision a logically isolated virtual network within the computing resource service provider 602 environment. Within this isolated virtual network, a customer 604 may be able to define a range of IP addresses for various computing resources and configure network gateways and virtual network interfaces to enable public communications with these computing resources. Through the virtual network service 618, a customer 604 may be able to create a network connection between his/her on-premises network and the virtual network, such that the computing resources within the computing resource service provider 602 environment may be able to access computing resources located within the customer's on-premises network.

The virtual computing environment service 620 may allow customers 604 to interact, through the interface, with one or more virtual computing environments. For instance, the virtual computing environment service 620 may enable customers 604 to remotely manage and maintain one or more virtual machine images. These virtual machine images may be maintained in data storage within a virtual machine image data store. When a customer 604 submits a request for provisioning a virtual machine instance, the virtual computing environment service 620 may identify the machine image the customer 604 has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host for the instance. The virtual computing environment may be configured to communicate with one or more managed directories through the managed directory service 616 or through a directory domain controller within the customer's 604 on-premises network.

Figure 7:
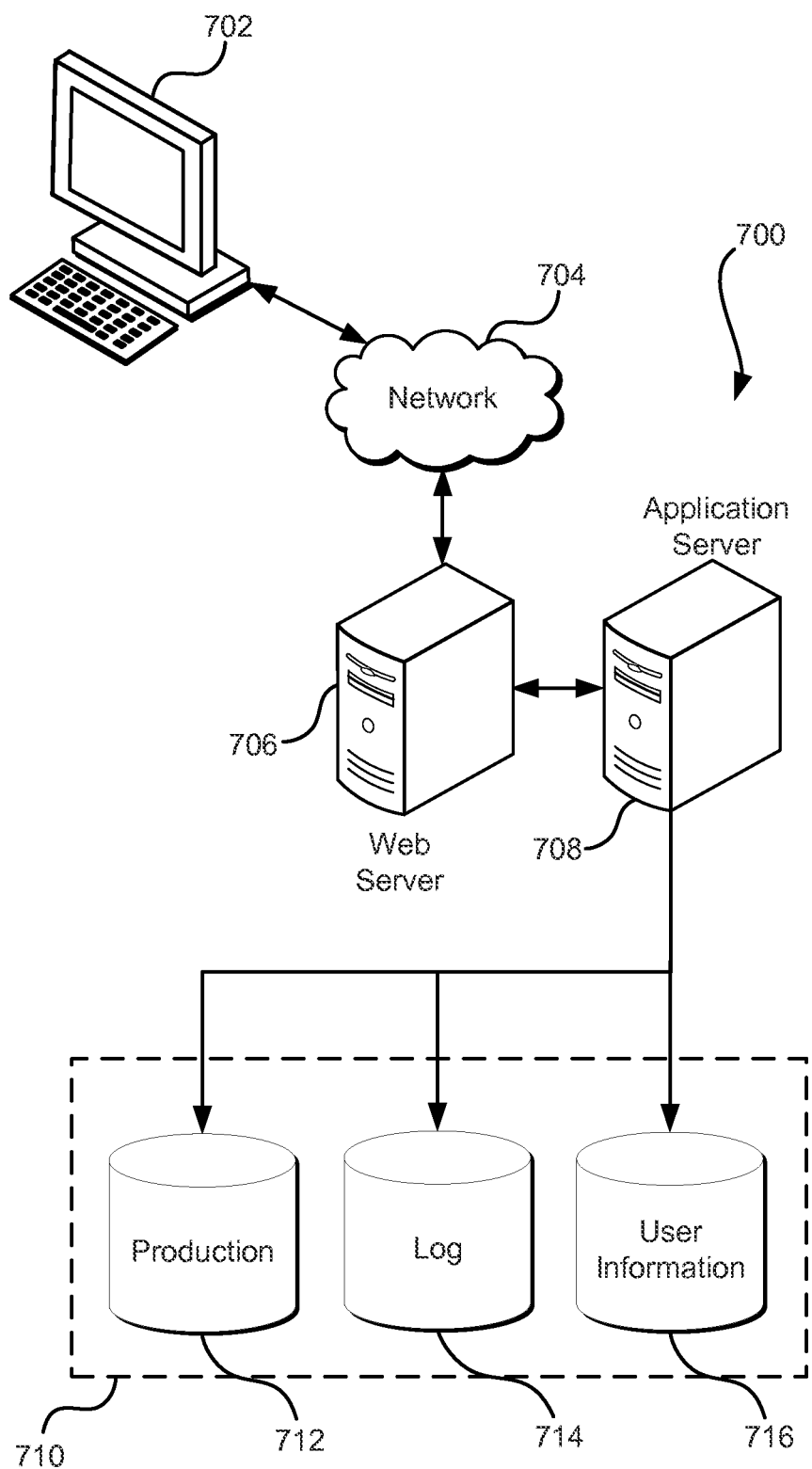
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, from a first requestor, a first request to establish a virtual desktop, the first request including authentication information usable to authenticate the first requestor of a virtual computing environment, the authentication information corresponding to a first set of permissions for accessing and controlling objects within the virtual desktop;
establishing the virtual computing environment to include a first communications channel between at least the first requestor and a virtual desktop service;
receiving, from the first requestor, user input that specifies a portion of the virtual desktop to provide to a second requestor as a data stream, the portion being less than all of the virtual desktop;
receiving from the second requestor, a second request to join the virtual computing environment, the second request including registration information, the registration information being:
usable to identify the second requestor and the virtual desktop service; and
associated with a set of user client credentials generated by the first requestor that correspond to a second set of permissions for receiving at least a part of the data stream from the virtual desktop service, the data stream being at least a part of the virtual desktop, wherein the set of user client credentials has been transmitted to the second requestor from the first requestor subsequent to the first communications channel being established between at least the first requester and the virtual desktop service;
joining the second requestor, based at least in part on the registration information, to the virtual computing environment, wherein joining the second requestor includes establishing a second communications channel between at least the second requestor and the virtual desktop service;
receiving the data stream from the virtual desktop service; and
transmitting the data stream to the second requestor.

2. The computer-implemented method of claim 1, wherein the user input received via the first requestor includes interaction event data, the interaction event data being used to track movement of a user input device.

3. The computer-implemented method of claim 1, wherein the registration information comprises individual registration information assigned to each requestor or shared registration information assigned to all requestors.

4. The computer-implemented method of claim 1, wherein the virtual desktop is managed on behalf of a customer, within a managed virtual desktop service provided by a computing resource service provider.

5. The computer-implemented method of claim 1, wherein the second request is received at a gateway prior to the second requestor being joined to the virtual computing environment.

6. A system, comprising:
one or more processors; and
memory storing instructions that, if executed by the one or more processors, cause the system to at least:
receive, at a virtual desktop service, a request from a first client for a virtual desktop, the first client authorized to specify which portion of the virtual desktop to provide to a second client;
as a result of the request, initiate a transmission of a first stream of the virtual desktop to the first client from the virtual desktop service;
receive an action for the virtual desktop from the first client, the action being determined based on user input received at the first client that specifies a portion of the virtual desktop to provide to the second client as a second stream;
wherein credentials are received at the second client, based at least in part on the transmission of the first stream being initiated, the credentials being provided by the first client; and
send, subsequent to the first client providing the credentials and as a result of the user input specifying a portion of the virtual desktop to provide as a second stream, the second stream to the second client, the second client being operably interconnected with the virtual desktop service, being less than all of the virtual desktop.

7. The system of claim 6, wherein a proxy server receives a request, from at least the second client, to join the virtual desktop service, the request including encrypted information capable of being decrypted by the proxy server.

8. The system of claim 7, further comprising a connection manager configured to decrypt the encrypted information, the connection manager being operably interconnected to the first client, the proxy server, or the virtual desktop service.

9. The system of claim 6, wherein a proxy server is a security gateway capable of enabling the first stream to be transmitted via a communication channel between the first client and the virtual desktop service.

10. The system of claim 6, wherein the first client is associated with a first account specifying an access right of the first client, and wherein the second client is associated with a second account specifying an access right of the second client.

11. The system of claim 6, wherein a proxy server is operably interconnected with a resource controller and the second client transmits a request, to the resource controller, to receive the virtual desktop from the virtual desktop service, and, wherein the resource controller transmits a token in response to the request.

12. The system of claim 11, wherein the instructions further cause the system to:
receive another request, at a proxy server from the second client, to join the virtual desktop service, the other request including the token;
transmit a validation request, from the proxy server to the resource controller, to confirm the token as valid; and
upon receiving confirmation that the token is valid, establish a connection between the virtual desktop service and the second client.

13. The system of claim 6, wherein a proxy server is operably interconnected with a resource controller and is further configured to provide information associated with the second client to the resource controller, wherein the resource controller is capable of authenticating the information.

14. A non-transitory computer-readable storage medium having stored thereon executable instructions that, if executed by one or more processors of a computer system, cause the computer system to:
receive a request at a virtual desktop service, from a master client, for a virtual desktop, the master client controlling access of servant clients to the virtual desktop;
as a result of the request, transmit the virtual desktop to the master client via a gateway;
wherein:
credentials are received at a servant client subsequent to a communication channel being established, via the gateway, between the virtual desktop service and the master client, the credentials being provided by the master client; and
the credentials are sent at the master client to the gateway;
receive a first data stream for the virtual desktop from the master client, the first data stream being determined at least in part according to user input received at the master client that specifies a second data stream to the servant client, the second data stream containing less than all of the virtual desktop; and
enable the servant client to receive the second data stream via the gateway.

15. The non-transitory computer-readable storage medium of claim 14, wherein the request for the virtual desktop includes information for the master client, the information corresponding to a network address of the virtual desktop and being usable to establish a communications channel with the virtual desktop, the communications channel being established as a result of the gateway authenticating the information.

16. The non-transitory computer-readable storage medium of claim 14, wherein the executable instructions further cause the computer system to track the user input received at the master client, wherein tracking the user input includes tracking user interaction event data for the virtual desktop.

17. The non-transitory computer-readable storage medium of claim 16, wherein the executable instructions that cause the computer system to track the user input further cause the computer system to perform the tracking without indication of tracking on a graphical user interface of the master client.

18. The non-transitory computer-readable storage medium of claim 16, wherein the executable instructions that cause the computer system to track the user input further cause the computer system to perform the tracking with indication of tracking on a graphical user interface of the master client.

19. The non-transitory computer-readable storage medium of claim 14, wherein the executable instructions further cause the computer system to receive a join request from the servant client, the join request identifying the servant client.

20. The non-transitory computer-readable storage medium of claim 14, wherein the executable instructions further cause the computer system to ignore, at the gateway, any incoming data streams from the servant client.

21. The non-transitory computer-readable storage medium of claim 14, wherein the gateway is a multitenant service provided via a computing resource service provider, and wherein the gateway is configured to multiplex or multicast the first and the second data stream received from the virtual desktop service.

* * * * *